(12) United States Patent
Divakaran et al.

(10) Patent No.: US 6,600,784 B1
(45) Date of Patent: Jul. 29, 2003

(54) DESCRIPTOR FOR SPATIAL DISTRIBUTION OF MOTION ACTIVITY IN COMPRESSED VIDEO

(75) Inventors: Ajay Divakaran, Denville, NJ (US); Kadir A. Peker, Paterson, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/496,707

(22) Filed: Feb. 2, 2000

(51) Int. Cl.$^7$ .......................... H04N 7/12; H04N 11/04; H04N 11/02
(52) U.S. Cl. ...................... 375/240.14; 375/240.08; 348/416.1; 348/699
(58) Field of Search ................. 375/240.16, 340.24, 375/240.08; 348/416.1, 699; 382/239, 236, 168, 170, 171

(56) References Cited

U.S. PATENT DOCUMENTS

| | | | | |
|---|---|---|---|---|
| 5,929,912 A | * | 7/1999 | Aono et al. ................. | 348/398 |
| 6,064,436 A | * | 5/2000 | Okada ........................ | 348/416 |
| 6,178,265 B1 | * | 1/2001 | Haghighi .................... | 382/236 |
| 6,208,693 B1 | * | 3/2001 | Chen et al. ............. | 375/240.24 |
| 6,272,253 B1 | * | 8/2001 | Bannon et al. .............. | 382/236 |
| 6,389,168 B2 | * | 5/2002 | Altunbasak et al. ........ | 382/224 |
| 6,456,660 B1 | * | 9/2002 | Yokoyama ............. | 375/240.16 |

OTHER PUBLICATIONS

So–Yeon Kin and Yong Man Ro, Fast content–based MPEG Video Indexing using Object Motion, Multimedia Information and Comunication Group, Information and Comminications University (ICU), 0–7803–5739–6/99 1999 IEEE.*

Ajay Divkaran, Kadir Peker, Huifang Sun, A Region Based Descriptor for Spatial Distribution of Motion Activity for Compressed Video, Advanced Television Laboratory, Mitsubishi Electric ITA, 0–7803–6297–7/00, 2000 IEEE.*

* cited by examiner

*Primary Examiner*—Chris Kelley
*Assistant Examiner*—Charles Parsons
(74) *Attorney, Agent, or Firm*—Dirk Brinkman

(57) ABSTRACT

A method describes motion activity in a video sequence. A motion activity matrix is determined for the video sequence. A threshold for the motion activity matrix is determined. Connected regions of motion vectors at least equal to the threshold are identified and measured for size. A histogram of the distribution of the sizes of the connected areas is constructed for the entire video sequence. The histogram is normalized to characterize the spatial distribution of the video sequence in a motion activity descriptor.

15 Claims, 3 Drawing Sheets

DESCRIPTOR FOR SPATIAL DISTRIBUTION OF MOTION ACTIVITY IN COMPRESSED VIDEO

FIELD OF THE INVENTION

The present invention relates generally to extracting features from a sequence of video frames, and more particularly to extracting the spatial distribution of motion activity in a compressed video.

BACKGROUND OF THE INVENTION

Basic standards for compressing the bandwidth of digital color video signals have been adopted by the Motion Picture Experts Group (MPEG). The MPEG standards achieve compression rates by developing information for a full frame of the image only every so often. The full image frames, i.e., intra-coded frames, are often referred to as "I-frames" or "anchor frames," and contain full frame information independent of any other frame. Image difference frames, i.e., inter-coded frames, are often referred to as "B-frames" and "P-frames," or as "predictive frames," and are encoded between the I-frames and reflect only image differences, i.e., residues, with respect to the reference frame.

Typically, each frame of a video sequence is partitioned into smaller blocks of picture elements, i.e., pixel data. Each block is subjected to a discrete cosine transformation (DCT) function that converts the statistically dependent spatial domain pixels into independent frequency domain DCT coefficients. Respective 8×8 or 16×16 blocks of pixels, referred to as "macro-blocks," are subjected to the DCT function to provide the coded signal.

The DCT coefficients are usually energy concentrated so that only a few of the coefficients in a macro-block represent the main part of the picture information. For example, if a macro-block contains an edge boundary of an object, the energy in that block after transformation, i.e., as represented by the DCT coefficients, includes a relatively large DC coefficient and randomly distributed AC coefficients throughout the matrix of coefficients.

A non-edge macro-block, on the other hand, is usually characterized by a similarly large DC coefficient and a few adjacent AC coefficients that are substantially larger than other coefficients associated with that block. The DCT coefficients are typically subjected to adaptive quantization, and then are run-length and variable-length encoded for the transmission medium. Thus, the macro-blocks of transmitted data typically include fewer than an 8×8 matrix of codewords.

The macro-blocks of inter-coded frame data, i.e., encoded P or B frame data, include DCT coefficients which represent only the differences between predicted pixels and the actual pixels in the macro-block. Macro-blocks of intra-coded and inter-coded frame data also include information such as the level of quantization employed, a macro-block address or location indicator, and a macro-block type. The latter information is often referred to as "header" or "overhead" information.

Each P frame is predicted from the lastmost occurring I or P frame. Each B frame is predicted from an I or P frame between which it is disposed. The predictive coding process involves generating displacement vectors, often referred to as "motion vectors," which indicate the magnitude of the displacement to the macro-block of an I frame most closely matching the macro-block of the B or P frame currently being coded. The pixel data of the matched block in the I frame is subtracted, on a pixel-by-pixel basis, from the block of the P or B frame being encoded, to develop the residues. The transformed residues and the vectors form part of the encoded data for the P and B frames.

Older video standards, such as ISO MPEG-1 and MPEG-2, are relatively low-level specifications primarily dealing with temporal and spatial compression of video signals. With these standards, one can achieve high compression ratios over a wide range of applications. Newer video coding standards, such as MPEG-4, see "Information Technology—Generic coding of audio/visual objects," ISO/IEC FDIS 14496-2 (MPEG4 Visual), November 1998, allow arbitrary-shaped objects to be encoded and decoded as separate video object planes (VOP). These emerging standards are intended to enable multimedia applications, such as interactive video, where natural and synthetic materials are integrated, and where access is universal. For example, one might want to extract features from a particular type of video object, or to perform for a particular class of video objects.

With the advent of new digital video services, such as video distribution on the Internet, there is an increasing need for signal processing techniques for identifying information in video sequences, either at the frame or object level, for example, identification of activity.

Feature Extraction

Previous work in feature extraction for video indexing from compressed data has primarily emphasized DC coefficient extraction. In a paper entitled "Rapid Scene Analysis on Compressed Video," IEEE Transactions on Circuits and Systems for Video Technology, Vol. 5, No. 6, December 1995, page 533–544, Yeo and Liu describe an approach to scene change detection in the MPEG-2 compressed video domain. The authors also review earlier efforts at detecting scene changes based on sequences of entire uncompressed image data, and various compressed video processing techniques of others. Yeo and Liu introduced the use of spatially reduced versions of the original images, so-called DC images, and DC sequences extracted from compressed video to facilitate scene analysis operations. Their "DC image" is made up of pixels which are the average value of the pixels in a block of the original image and the DC sequence is the combination of the reduced number of pixels of the DC image. It should be noted that the DC image extraction based technique is good for I-frames since the extraction of the DC values from I-frames is relatively simple. However, for other type frames, additional computation is needed.

Won et al., in a paper published in Proc. SPIE Conf. on Storage and Retrieval for Image and Video Databases, January 1998, described a method of extracting features from compressed MPEG-2 video by making use of the bits expended on the DC coefficients to locate edges in the frames. However, their work was limited to I-frames only.

Kobla et al. describe a method in the same Proceedings using the DC image extraction of Yeo et al. to form video trails that characterize the video clips.

Feng et al. (IEEE International Conference on Image Processing, Vol. II, pp. 821–824, Sep. 16–19, 1996), used the bit allocation across the macro-blocks of MPEG-2 frames to detect abrupt scene changes, without extracting DC images. Feng et al.'s technique is computationally the simplest since it does not require significant computation beyond that required for parsing the compressed bit-stream.

U.S. Patent Applications entitled "Methods of scene change detection and fade detection for indexing of video sequences" application Ser. No. 09/231,698, filed Jan. 14, 1999), "Methods of Feature Extraction for Video Sequences" application Ser. No. 09/236,838, Jan. 25, 1999, describe computationally simple techniques which build on certain aspects of Feng et al.'s approach and Yeo et al.'s approach to give accurate and simple scene change detection. Once a suspected scene or object change has been accurately located in a group of consecutive frames by use of a DC image extraction based technique, application of an appropriate bit allocation-based technique and/or an appropriate DC residual coefficient processing technique to P or B-frame information in the vicinity of the located scene quickly and accurately locates the cut point. This combined method is applicable to either MPEG-2 frame sequences or MPEG-4 multiple object sequences. In the MPEG-4 case, it is advantageous to use a weighted sum of the change in each object of the frame, using the area of each object as the weighting factor.

U.S. patent application Ser. No. 09/345,452 entitled "Compressed Bit-Stream Segment Identification and descriptor" filed by Divakaran et al. on Jul. 1, 1999 describes a technique where magnitudes of displacements of inter-coded frames are determined based on the bits in the compressed bit-stream associated with the inter-coded frames. The inter-coded frame includes macro-blocks. Each macro-block is associated with a respective portion of the inter-coded frame bits which represent the displacement from that macro-block to the closest matching intra-coded frame. The displacement magnitude is an average of the displacement magnitudes of all the macro-blocks associated with the inter-coded frame. The displacement magnitudes of those macro-blocks which are less than the average displacement magnitude are set to zero. The number of run lengths of the zero magnitude macro-blocks is determined and also used to identify the first inter-coded frame.

Motion Activity

Work done so far has focussed on extraction of motion information, and using the motion information for low level applications such as detecting scene changes. There still is a need to extract features for higher level applications. For example, there is a need to extract features that are indicative of the nature of the spatial distribution of the motion activity in a video sequence.

Video or animation sequence can be perceived as a slow sequence, a fast paced sequence, an intermittent sequence and the like. The activity feature captures this intuitive notion of 'intensity of action' or 'pace of action' in a video segment. Examples of high and low 'activity' are sporting events and talking heads, respectively.

A good motion activity descriptor would enable applications such as video browsing, surveillance, video content re-purposing, and content based querying of video databases. For example, in video browsing, activity feature can enable clustering of the video content based on a broad description of the activity. For these applications, one needs to go beyond the intensity of the motion activity to other attributes of the activity such as spatial and temporal distribution of activity.

SUMMARY OF THE INVENTION

The invention provides a descriptor for the spatial distribution of motion activity in a video sequence. The invention uses the magnitude of motion vectors extracted from the video sequence as a measure of the intensity of motion activity in macro-blocks in the frames of the video. A motion activity matrix $C_{mv}$ including the magnitudes of the motion vector is constructed for each macro-block of a given P frame.

A threshold is determined for the motion activity matrix. In one embodiment, the threshold is the average magnitude $C_{mv}^{avg}$ for each macro-block. All elements of $C_{mv}$ that are less than the threshold are set to zero. Other thresholds can also be used. The threshold can be the average plus some empirically determined constant to provide robustness against noise. The median of the motion vector magnitudes can also be used. This would prevent a few large values from unduly influencing a threshold based on the average. One can also use the most common motion vector magnitude, in the other words, the mode. Because this is basically a clustering problem, one could use any of the well known clustering techniques based on K-means, such as neural nets and vector support machines, to divide the motion vectors into two categories based on their magnitudes. In this case, the boundary between the two clusters can be used as the threshold.

Next, a histogram is constructed for the entire video sequence. The "bins" of the histogram accumulate statistics for areas of distinct and connected regions of non-zero values in the thresholded matrix. Another threshholding process is applied to the histogram, and the histogram is scaled with respect to the average size of the non-zero motions, and thus normalized with respect to the size of the frames.

With a convolution-like similarity measure, the descriptor of the invention has better precision-recall performance than the spatial activity descriptor in the current MPEG-7 experimental model.

It is also possible to capture the effects of camera motion and non-camera motion in distinct uncorrelated parts of the present descriptor. Because the feature extraction takes place in the compressed domain, it can be performed faster than prior art feature extractions from uncompressed video sequences.

In tests on the MPEG-7 test content set, which includes approximately fourteen hours of MPEG-1 encoded video content of different kinds, the present descriptor enables fast and accurate indexing of video. The descriptor is robust to noise and changes in encoding parameters such as frame size, frame rate, encoding bit rate, encoding format, and the like. This is a low-level non-semantic descriptor that gives semantic matches within the same program, and is thus very suitable for applications such as video browsing.

More particularly, the invention provides a method for describing motion activity in a video sequence. A motion activity matrix is determined for the video sequence. A threshold for the motion activity matrix is determined. Connected regions of motion vectors at least equal to the threshold are identified and measured for size. A histogram of the distribution of the sizes of the connected areas is constructed for the entire video sequence. The histogram is normalized to characterize the spatial distribution of the video sequence in a motion activity descriptor.

DETAILED DESCRIPTION OF THE PREFERRED EMBODIMENT

Figure 1:
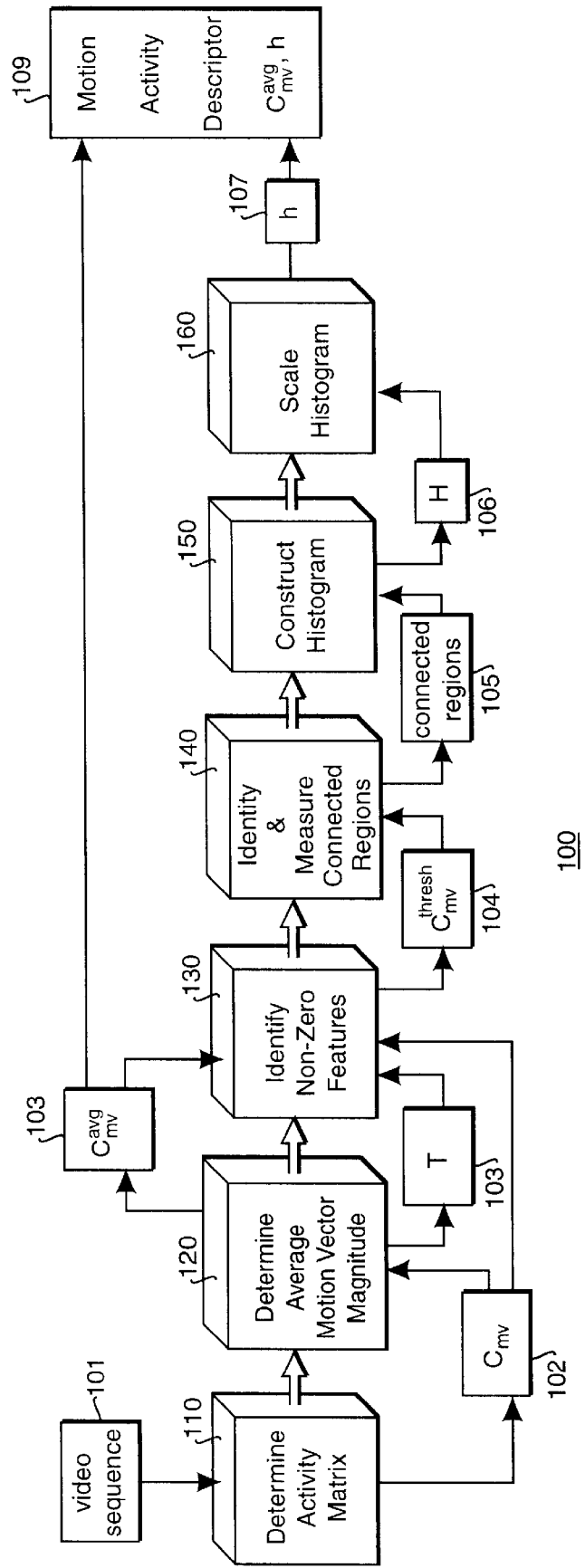
FIG. 1 is a block diagram of a method for describing the spatial distribution of motion activity in a video according to the invention.

FIG. 1 shows a method 100 for describing the spatial distribution of motion activity according to our invention.

We determine the average motion vector magnitude per macro-block ($C_{mv}^{avg}$) of a video frame or video object by taking the average of the magnitudes of block motion vectors in P frames of a compressed video sequence. This process is described in U.S. patent application Ser. No. 09/236,838 "Method of Feature Extraction of Video Sequences" filed by Divakaran et al. on Jan. 25, 1999 incorporated herein by reference.

In short, for each video frame or object of a video sequence 101, step 110 determines a motion activity matrix $C_{mv}$ 102:

$$C_{mv} = \{R(i,j)\}, (R(i,j)) = \sqrt{x_{i,j}^2 + y_{i,j}^2}$$

where ($x_{i,j}, y_{i,j}$) is the motion vector associated with the (i,j)th block.

In this determination, we consider only P frames/objects, and construct the descriptor for a frame in the following steps. For intra-coded blocks, R(i,j)=0.

Step 120 determines a threshold T 103. One threshold that can be used is the average motion vector magnitude per macro-block of the frame/object. The average $C_{mv}^{avg}$ 103 is given by:

$$C_{mv}^{avg} = \frac{1}{MN} \sum_{i=0}^{M} \sum_{j=0}^{N} C_{mv}(i,j)$$

where $M$ = width in MB's, $N$ = height in MB's

Other thresholds can also be used. The threshold can be the average plus some empirically determined constant to provide robustness against noise. The median of the motion vector magnitudes can also be used. This would prevent a few large values from unduly influencing a threshold based on the average. One can also use the most common motion vector magnitude, in the other words, the mode. Because this is basically a clustering problem, one could use any of the well known clustering techniques based on K-means, such as neural nets and vector support machines, to divide the motion vectors into two categories based on their magnitudes, and use the boundary between the two clusters as the threshold.

Next, step 130 identifies features of the activity matrix $C_{mv}$ that have motion greater than the threshold 103 as $C_{mv}^{thresh}$ 104. The threshol T is applied on $C_{mv}$ as follows:

$$C_{mv}^{thresh}(i,j) = \{C_{mv}(i,j), \text{ if } C_{mv}(i,j) \geq T, \ 0 \text{ otherwise}$$

That is, if an element in the motion activity vector matrix is less than the threshold 103, then set the element to zero.

Step 140 identifies and measures the areas (size) of connected regions 105 of non-zero values in the activity matrix. That is, identify immediately adjacent macroblocks having motion vectors that are at least as large as the average motion vector magnitude, and count the number of macroblocks in such regions to measure the size (area) of the region.

Step 150 constructs a histogram H 106 of the non-zero connected regions for the entire video sequence. The bins in the histogram are of a non-uniform width following a logarithmic-like scale, see FIGS. 3a–c for sample histograms. The bins can be roughly grouped for small, medium and large areas of non-zero motion.

An area of non-zero motion that is larger than half the area of the frame usually signals a global motion such as a camera pan. Therefore, the last two bins of the histogram can be used as an indicator of camera motion in the video sequence.

In step 160, the histogram 106 is scaled by the average of the non-zero motion areas of each bin to yield a scaled histogram h 107 where:

$$h_i(i), i=1 \ldots N_{bins}$$

The value in each bin, i.e., the number of regions of a particular size, is divided by the average size of connected regions of the histogram with rounding. A square root operation is used as a compander on the bin values to emphasize the existence of non-zero motion areas in bins rather than the absolute number of non-zero motion areas in the bins.

The normalized histogram h 107 becomes the descriptor for the spatial distribution of motion in the video 101. Optionally, the average motion vector $C_{mv}^{avg}$ 103 can also be used with H 107 to produce a combined descriptor 109.

Using the Descriptor for Video Matching

Figure 2:
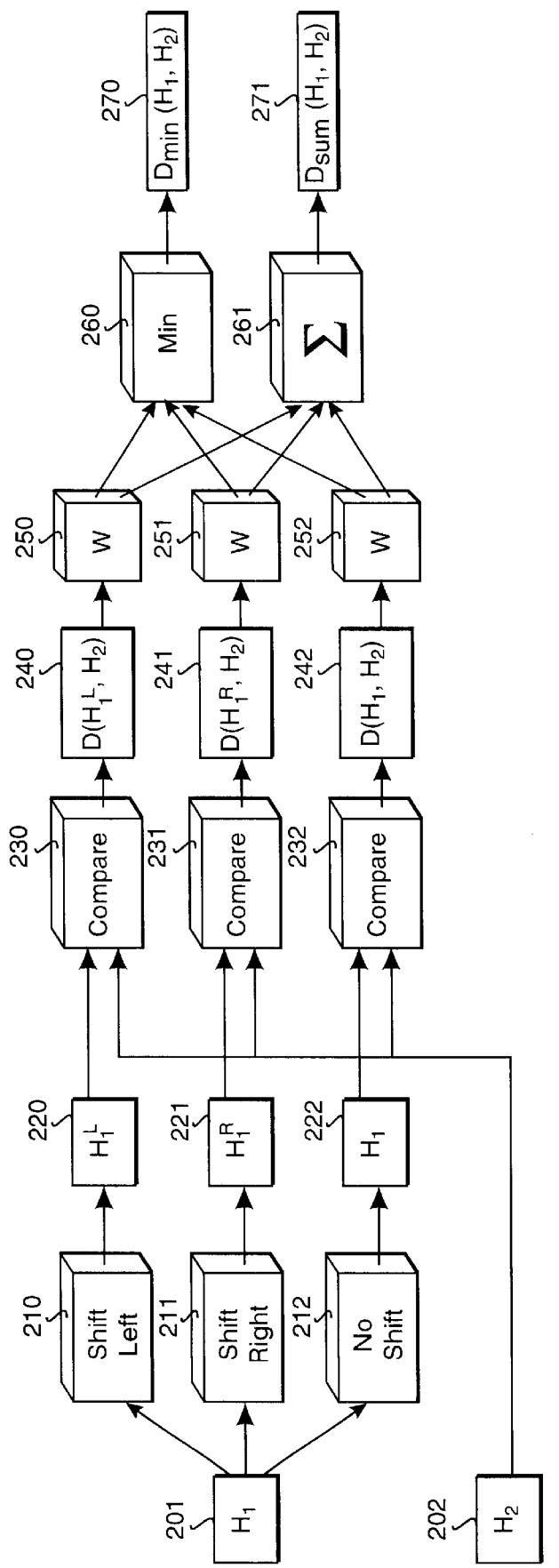
FIG. 2 is a block diagram for determining distances between histograms.

The descriptor H 107 can be used to compare videos. As shown in FIG. 2, we use a weighted correlation comparison procedure 200 for matching descriptor values. Because the non-zero motion areas do not need to match exactly for an acceptable match, we can also consider distances between one-shifted versions of the histograms. However, when the distances is determined using the shifted versions of the histogram, we use a multiplication factor of w>1 to favor exact matches.

Accordingly, in steps 210–212, we left shift, right-shift, and no shift a first histogram $H_1$ 201 to produce $H_1^L$ 220, $H_1^R$ 221, and $H_1$ 222, respectively. Each of the histograms 220 is compared with a second histogram $H_2$ 202 in steps 230–232 to determine distances $D(H_1^L, H_2)$ 240, $D(H_1^R, H_2)$ 241, and $D(H_1, H_2)$ 242, respectively. The distances are weighted by w in steps 250–252 as described above.

At this point, a final distance between the two histograms 201–202 can be determined in at least two possible ways. Step 260 takes the minimum distance $D_{min}(H_1, H_2)$ 270 of the weighted distances. Step 261 takes the sum $D_{sum}(H_1, H_2)$ 271 as the distance between the histograms.

Note that another alternative is a combination of the alternatives described above. For example, the distance between the two histograms could be computed by adding the minimum of the distances $D(H_1^L, H_2)$ 240, $D(H_1^R, H_2)$ 241, to $D(H_1, H_2)$ 242. This can also be regarded as an example of non-linear generations of the weights used in the second alternative.

Results with MPEG-7 Video Test-Set

We apply our descriptor as described above to the MPEG-1, the "V3" video sequences from the MPEG-7 test set. We illustrate some examples of retrieval in Table 1.

TABLE 1

| Representative Frame Number | Description of Activity | Average Motion Vector Magnitude |
|---|---|---|
| 408 | Anchor person | 2 |
| 10400 | Three people walking | 12 |
| 36730 | Pan of Soccer Game | 23 |

As can be seen from Table 1, our motion activity descriptor enables semantic shot classification and matching within a video sequence. Our descriptor consistently obtains values of precision ranging from 1/10 to 5/5 within a video sequence as shown in Table 2.

TABLE 2

| Query Shot | Precision Matches/10 | Total number of possible matches in the data set | Recall |
|---|---|---|---|
| News anchor | 10/10 | ~340 | 0.03 |
| Walking people | 5/10 | 20 | 0.25 |
| Soccer shot | 3/10 | 11 | 0.3 |

For example, with the Spanish news sequence, we get 10/10 precision and 1/30 recall when we look for the anchor person. Note that the recall rate is constrained to be at most 10/(the total number of possible correct matches) because we retrieve only ten matches. We look for the soccer shots, the precision is reduced to 3/10, while the recall rate increases to 0.3. Our experiments with the test content indicate that our descriptor is able to match shots with similar spatio-temporal activity. If within the same program, then the semantic classes are widely separated in terms of intensity and distribution of spatio-temporal activity, and our descriptor performs well.

Figures 3A, 3B, 3C:
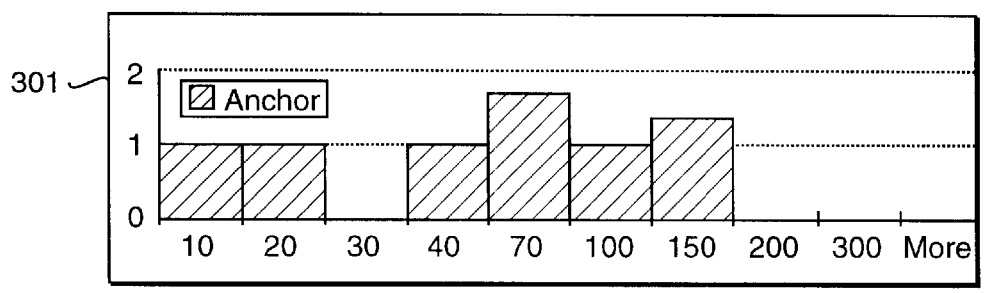
FIGS. 3a–c are histograms of the spatial distribution of motion according to the invention.

We illustrate our results with the Spanish news in Table 1 and FIGS. 3a–c for the corresponding histograms 301–303. We get similar results with other news programs. We are also able to detect camera motion such as pans with our non-zero motion structure since a pan produces a single large non-zero motion. Since our descriptor isolates camera motion segments in a shot, we are able to detect both camera and non-camera motion separately. We are thus able to improve upon the existing spatial motion activity descriptor in the MPEG-7 XM.

We presented a motion descriptor for characterizing the spatial distribution of activity in a video sequence. The descriptor according to our invention outperforms the existing spatial activity descriptor in the MPEG-7 XM proposed standard in terms of robustness to encoding parameter variations, precision-recall, detection and analysis of camera and non-camera motion etc. Our descriptor is comparable to the MPEG-7 descriptor in extraction simplicity, because we work with a compressed video. We also find that indirect and computationally simpler measures of the magnitude of the motion vectors such as bits taken to encode the motion vectors, though less effective, also can be used in our non-zero motion framework.

We use a threshholding procedure on motion-vector magnitudes to identify regions, or "non-zero motions", of activity in the frames. We then use the areas of these regions to determine a "thresholded" histogram of non-zero motion areas. We use this histogram as a "descriptor" for a video shot. The "areas of regions" approach is more effective because it is a direct measure of region size unlike run-lengths and is more easily normalized with respect to encoding parameters such as frame-rate, frame-size, etc. Furthermore, the descriptor is more robust to object translation, rotation, etc. The descriptor decouples camera motion and non-camera motion within a shot, thus providing more accurate activity description. We thus have a descriptor for a video shot that lends itself well to matching and searching.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for describing motion activity in a video, comprising the steps of:

determining a motion activity matrix for the video;
determining a threshold for the motion activity matrix;
identifying connected regions with motion vectors at least equal to the threshold;
measuring the size of the connected regions;
constructing a histogram of the connected areas of the video; and
normalizing the histogram to characterize the spatial distribution of the video in a motion activity descriptor.

2. The method of claim 1 wherein each frame of the video includes a plurality of macroblocks, and wherein each macro block includes a motion vector, and wherein the motion vectors of the macroblocks of the frames determine the motion activity matrix.

3. The method of claim 2 wherein the connected areas are immediately adjacent macroblocks having motion vectors at least equal to the threshold, and the size of each area is equal to the number of macroblocks in the areas.

4. The method of claim 3 wherein the threshold is an average motion vector magnitude.

5. The method of claim 4 wherein the threshold is the average motion vector magnitude plus a predetermined constant.

6. The method of claim 3 wherein the threshold is a median of the motion vector magnitudes.

7. The method of claim 3 wherein the threshold is a most common motion vector magnitude.

8. The method of claim 3 wherein the threshold is a boundary between two clusters of motion vector magnitudes.

9. The method of claim 1 wherein the histogram has a plurality of bins, and the bins follow a logarithmic-like scale.

10. The method of claim 2 wherein connected areas larger than half the area of the frame indicate global motion.

11. The method of claim 9 wherein the normalizing further comprises:
dividing the value in each bin by the average size of connected regions of the histogram with rounding; and
applying a square root operation on the values of the bins as a compander.

12. The method of claim 1 further comprising:
describing a first video with a first motion activity descriptor derived from a first histogram;
describing a second video with a second motion activity descriptor derived from a second histogram; and
comparing the first and second motion activity descriptors to match the first and second videos.

13. The method of claim 12 further comprising the steps of:
left shifting the first histogram;
right shifting the first histogram;
no shifting the first histogram;
comparing the left, right, and no shifted first histogram with a second histogram to produce a first, second, and third distance, respectively;
weighting the first, second, and third distances.

14. The method of claim 13 further comprising the step of:
selecting the minimum of the weighted first, second, and third distances as a final distance between the first and second videos.

15. The method of claim 13 further comprising the step of:
summing the first, second, and third weighted distances to determine a final distance between the first and second videos.

* * * * *